United States Patent

[11] 3,626,155

[72] Inventor Stanley V. Joeckel
    Wayne, N.J.
[21] Appl. No. 93,762
[22] Filed Nov. 30, 1970
[45] Patented Dec. 7, 1971
[73] Assignee Irex Corporation
    Riverdale, N.J.

[54] ELECTRIC OVEN
    4 Claims, 6 Drawing Figs.
[52] U.S. Cl............................................. 219/411,
    99/327, 165/12, 219/398, 219/407, 219/413,
    219/490
[51] Int. Cl..................................... F27d 11/02
[50] Field of Search........................... 219/400,
    398, 405, 406, 407, 409, 410, 411, 412, 413, 480,
    492, 490; 99/327; 165/12

[56] References Cited
    UNITED STATES PATENTS
| | | | |
|---|---|---|---|
| 2,860,225 | 11/1958 | Steen............................ | 219/411 X |
| 3,032,636 | 5/1962 | Schauer, Jr.................... | 219/413 X |
| 3,059,087 | 10/1962 | Perlman........................ | 219/411 X |
| 3,155,814 | 11/1964 | Appleman et al............. | 219/407 |
| 3,176,118 | 3/1965 | Scott.............................. | 219/394 |
| 3,244,859 | 4/1966 | Whiteford..................... | 219/405 X |
| 3,249,741 | 5/1966 | Mills.............................. | 219/411 |
| 3,261,394 | 7/1966 | Foster et al................... | 165/12 |
| 3,265,861 | 8/1966 | Perlman........................ | 219/411 X |
| 3,313,917 | 4/1967 | Ditzler et al.................. | 219/400 |
| 3,460,460 | 8/1969 | Bixby et al.................... | 99/327 |

Primary Examiner—Volodymyr Y. Mayewsky
Attorney—Leo C. Krazinski

ABSTRACT: An electric oven for rapidly heating therein frozen convenience food in containers placed on plates having a thermal conductivity approximately equivalent to that of the food and means for pulsing heat energy upwardly through the plate and container into the food mass at timed intervals, pulsing infrared heat downwardly into the food mass at a predetermined wavelength range while reflecting a portion of the infrared heat to produce a required ambient condition, and regulating the air temperature within the oven, whereby a maximum tolerable rate of temperature rise in the food by conduction, radiation, and convection is provided.

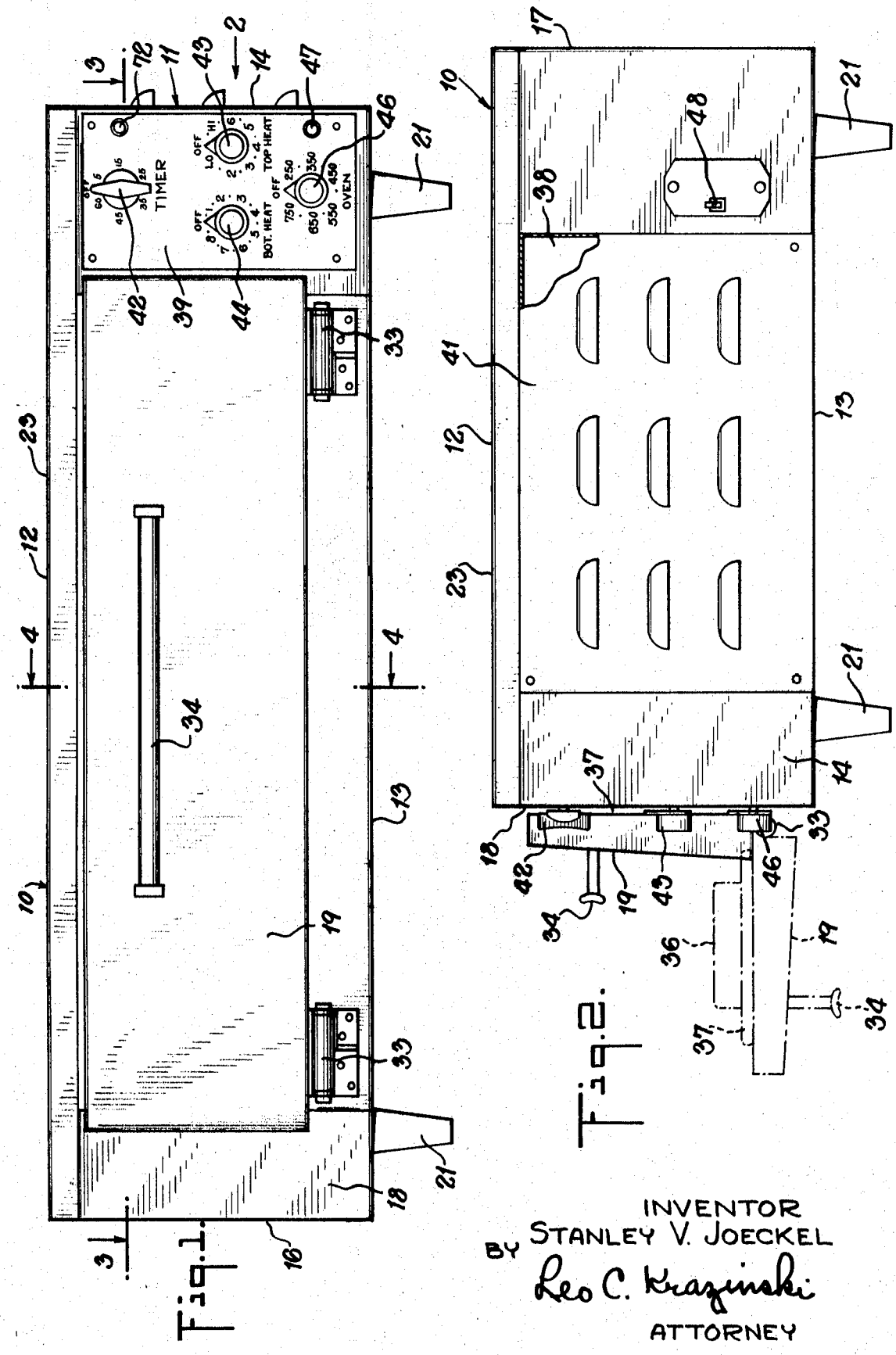

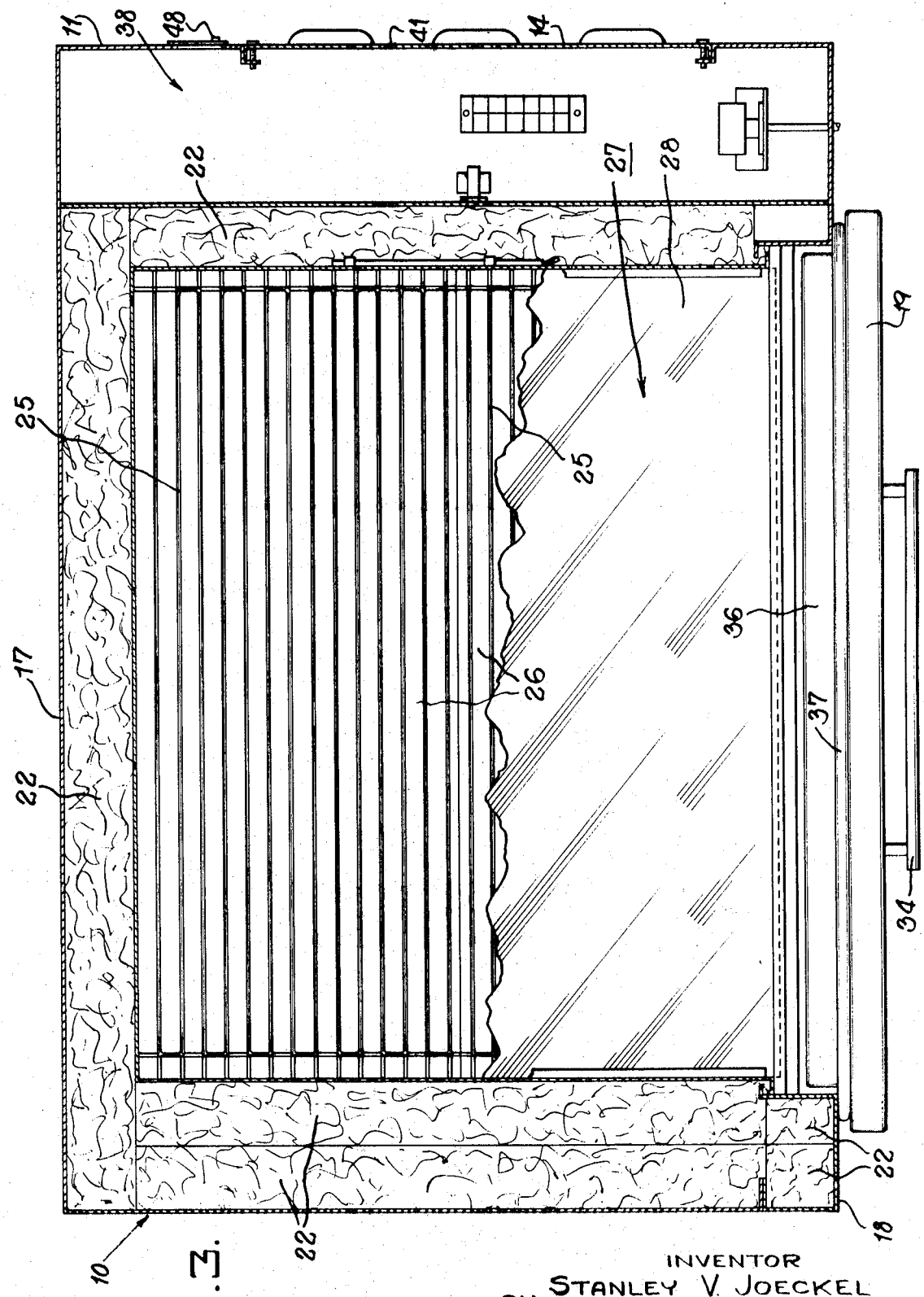

PATENTED DEC 7 1971

INVENTOR
STANLEY V. JOECKEL
BY
Leo C. Krazinski
ATTORNEY

ELECTRIC OVEN

BACKGROUND OF THE INVENTION

Field of Invention

The present invention relates to electric ovens and, more particularly, to electric ovens adapted for quickly heating frozen convenience foods, packed in flat, thin pans, to customer serving temperatures.

Heretofore, conventional ovens for heating frozen food have employed infrared radiation directed from both above and below the food, as in Stien U.S. Pat. No. 2,860,225; by a rotatable grill exposed to infrared radiation, as in Bixby et al., U.S. Pat. No. 3,460,460; and by pulsating heat through the food, as in Foster et al., U.S. Pat. No. 3,261,394. Such ovens, however, are not suitable for quickly heating frozen convenience foods efficiently for use particularly in large establishments, such as hospitals, colleges, nursing homes, large restaurants and the like.

It was discovered after experimentation that the limiting factor in heating frozen food products was the thermal conductivity of the food itself. Consequently, the method of applying heat energy to the food (whether infrared, convection, and or conduction) is a secondary consideration. After further experimentation it was discovered that no one method of applying heat energy could produce the desired effect of quickly heating a frozen convenience food product from 0° to 170° F.

Efforts were then directed to determine how to produce the maximum energy input to the food to accomplish optimal heating thereof without the necessity of (a) applying special coatings to the containers, (b) stirring the food within the container during the heating cycle, (c) prior thawing the food, and (d) destroying the original quality of the food, that is, without scorching, excessive dehydration, flavor change, loss of nutrients, etc.

It was also discovered that the material on which the food pan was placed had to have a thermal conductivity compatible with the frozen food placed thereupon. (Since most foods contain a very high percentage of water, the thermal conductivity of foods was considered to be constant.) The conductive plate material chosen was "Hercuvit 106" by PPG Industries, a glass ceramic material, having a thermal conductivity of about 0.004 Cal./cm.$^2$/sec./°C. The thermal conductivity of water containing salt in food is approximately 0.0016–0.0020. This is to be compared with aluminum (a common material used in cooking), which has a thermal conductivity of 0.5 or approximately 125 times as great as Hercuvit.

It was also discovered that the thickness of the plate (one-fourth inch), the wattage of the energy source (approx. 600 w./sq. ft.) under the plate, the temperature which the side of the plate adjacent to the source was allowed to reach (450° F.) and the energy input time cycle (approx. 30 percent to 70 percent of 5 minutes) were very important. Controls were therefore employed to pulse the input energy so as to permit the maximum tolerable energy flow, by conduction, from the heat source through the plate, through the food container and into the frozen foods mass. The result was to create the maximum tolerable rate of temperature rise in the food which the conductive principle would provide.

In addition, a top radiation source, controlled by an infinite-type controller, was designed to provide the proper frequency range (approx. 3 to 10 microns) to allow a portion of the heat to be absorbed by the food in the pan while the remainder was used to produce the required ambient condition. An ambient control was also provided to prevent the oven air temperature (approx. 800° F. max.) from exceeding those limits which would destroy the original quality of the food.

As above indicated, this invention therefore utilizes three heating principles, conduction, radiation and convection combined in an unique controlled way to achieve an optimal desired effect in rapidly bringing foods from a frozen or otherwise refrigerated state to serving temperatures in a manner which no single heating principle can satisfactorily accomplish.

SUMMARY OF THE INVENTION

Accordingly, an object of the invention is to provide a new and improved heating arrangement particularly for frozen convenience foods.

Another object of the invention is to provide such an electric oven that utilizes in an efficient manner the combination of conduction, radiation and convection in quickly heating frozen convenience foods.

Still another object of the invention is to provide an improved electric oven in which frozen convenience foods are heated to required serving temperatures for consumption within a much shorter time period than is possible with conventional ovens.

Other and further objects will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a front elevational view of an electric oven in accordance with the present invention.

FIG. 2 is an end elevational view of the electric oven, as viewed from the right side of FIG. 1 in the direction of the arrow 2, showing the oven door closed in full lines and the oven door open in dotted lines.

FIG 3 is a horizontal sectional view of the electric oven taken along line 3—3 of FIG. 1 with parts broken away to reveal interior construction and the cover shown in elevation.

DESCRIPTION OF THE PREFERRED EMBODIMENT

Figure 4:
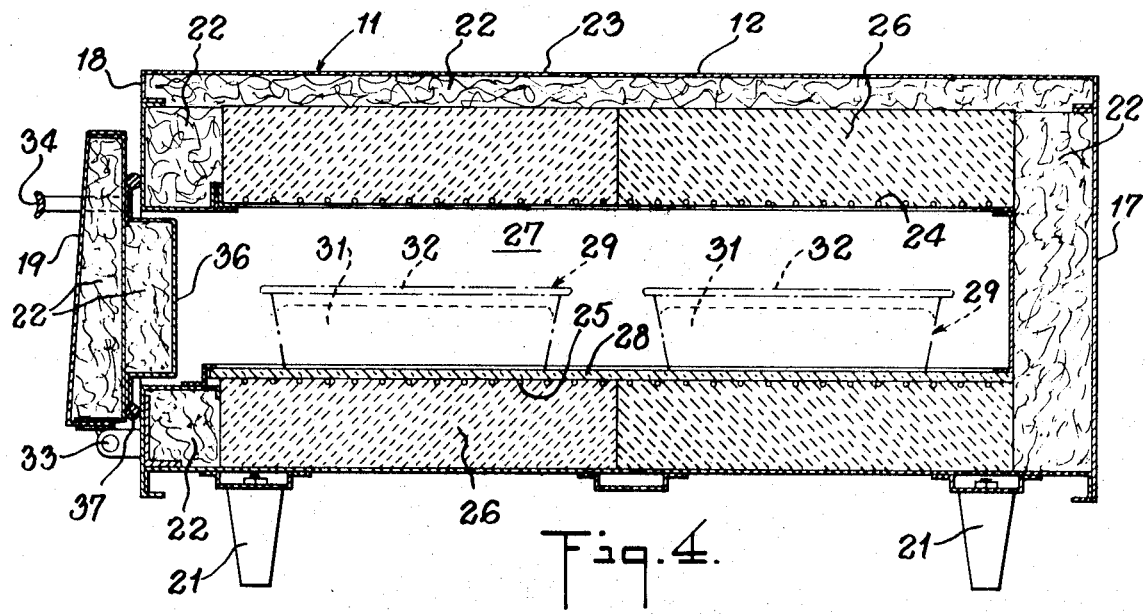

Referring now to FIGS. 1–4 of the drawings in detail, there is shown an electric oven of the invention comprising a casing 11, preferably of stainless steel construction, having, as viewed in FIG. 1, a top 12, a bottom 13, a right side 14, a left side 16, and, as viewed in FIG. 2, a back 17 and a front 18 with a bottom-hinged door 19, the bottom 13 being supported upon legs 21. As more readily evident in FIG. 4, the front 18 and back 17 of the casing 11 and portions of the bottom 13 and top 12 thereof, as well as the door 19, are provided with insulation 22. A top cover 23 for the casing is also provided with the insulation 22. In both the top 12 and bottom 13 are included infrared heating elements 24 and 25, respectively, backed by insulation 26, so that the infrared energy is directed inwardly within the oven-cooking compartment 27. Preferably, the infrared-heating elements 24, 25 and insulation 26 used in the oven of this invention are disclosed in pending application, Ser. No. 870,867, filed July 24, 1969, and which matured into U.S. Pat. No. 3,564,207 issued on Feb. 16, 1971.

Above the bottom-heating element 25, as viewed in FIG. 4, is shown a conductive plate 28, preferably "Hercuvit 106" of PPG Industries, a glass ceramic material, having a thermal conductivity of 0.004 Cal./cm.$^2$/sec./° C. Since there is a high percentage of water in food, including some salt, it can be assumed that the thermal conductivity of food is substantially equal to that of water, which is about 0.0016–0.0020. As aluminum is a material that is commonly used as a container in convenience foods, its thermal conductivity of 0.5 is about 125 times as great as that of "Hercuvit." With a thickness of one-fourth inch for the "Hercuvit" plate 28 an energy source of about 600 w./sq. ft. under the plate 28 is impressed to provide a temperature of about 450° F. at that underside and kept for various time intervals, that is, the energy input can be pulsed so as to be ON 30 percent and OFF 70 percent of 5 minutes, or ON 40 percent, OFF 60 percent, ON 70 percent, OFF 30 percent, etc. This permits the maximum tolerable energy flow, by conduction, through the plate 28, through the aluminum food container 29 and into the food mass 31.

Referring still to FIG. 4, the top infrared-heating element 24 delivers heat energy at a wavelength ranging from about 3 to 10 microns allowing about 30 percent of the heat energy to be absorbed by the container 29 and top 32, while the remaining heat energy is reflected to produce the required ambient condition, as will appear hereinafter. If the cover 32 is removed from the container 29, a larger portion of the heat energy is directly absorbed by the food, while a smaller amount of the energy produces the ambient condition. Of course, to accomplish the proper heating efficiency in the compartment 27 the door 19 must be closed; but the door must also be thoroughly insulated. The door 19 is coupled to the casing 11 at its bottom by a hinge 33, has a handle 34 at its front for manipulation thereof, an insulated rear extension 36 that projects into the compartment 27, and to further seal the compartment in its closed position a gasket 37 is included at its rear peripheral face adjacent the extension 36.

Referring again to FIG. 1, the oven 10 includes at its right portion an electrical compartment 38 for housing electrical components and having a panel 39 for mounting the same with a louvered access panel 41 (FIG. 2) at its right side 14. Adjacent the top of panel 39 is shown a knob 42 for a 60 minute interval timer, below which are control knobs 43 and 44 for the bottom-heating element 25 and top-heating element 24, respectively, and adjacent the bottom a knob 46 for an oven temperature control. An oven temperature pilot lamp 47 is shown adjacent the knob 46. A power disconnect switch 48 is provided on the right side 14, adjacent panel 41 for turning on and off the power supply to the oven 10.

Figure 6:
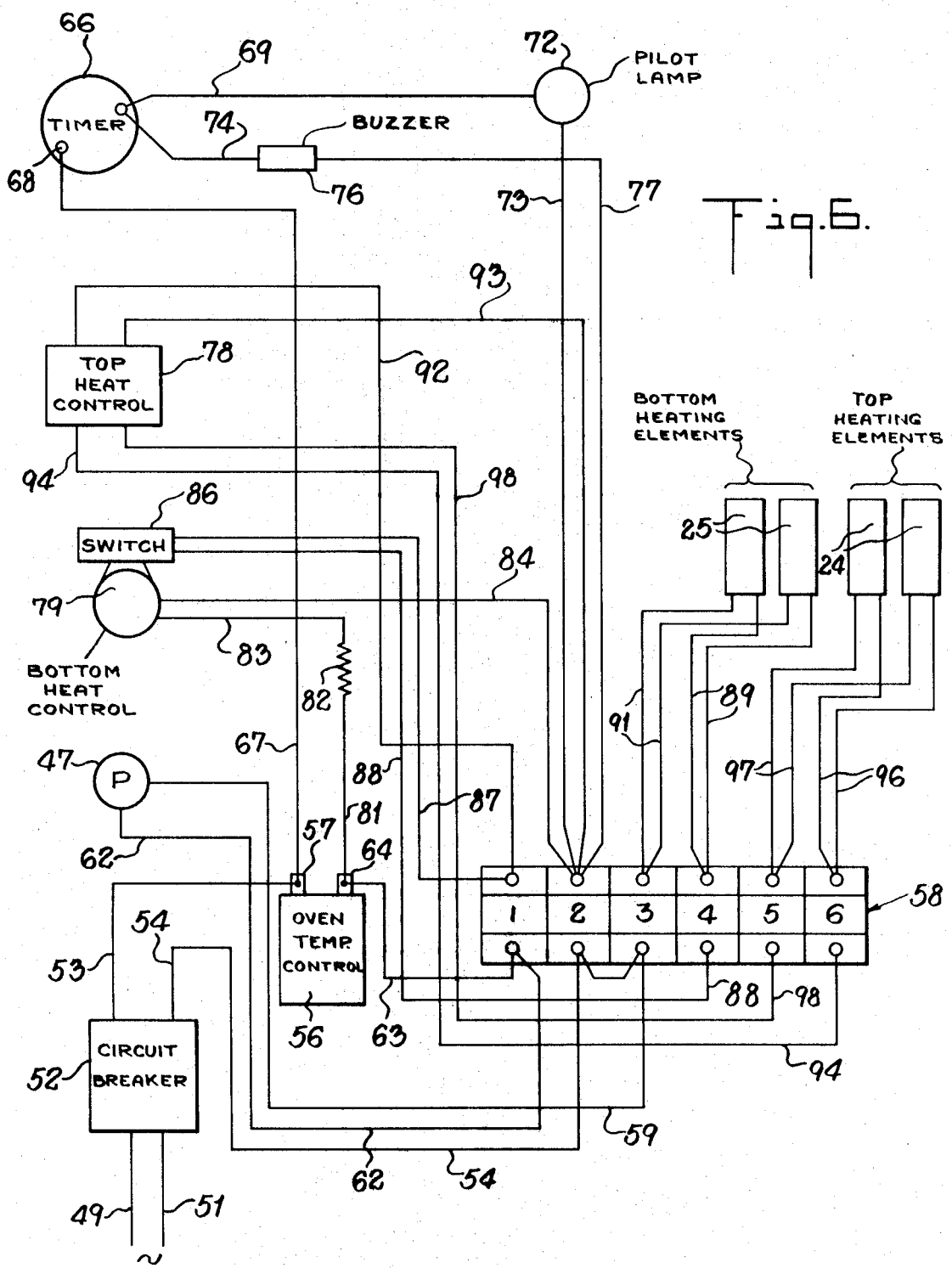
FIG. 6 is a diagram of the circuitry for controlling the electric oven.

Referring now to FIG. 6, wherein the electrical supply and control systems are represented schematically, the main power supply is from a pair of alternating current supply leads 49 and 51 of suitable voltage, such as 208 or 230 volts, alternating current. Since the invention will be more clearly understood by tracing the operations involved, let it be assumed that it is desirous to heat frozen convenience food packed in flat, thin pans or containers ranging up to 12inches×20 inches×2¼ inches in size and being of aluminum material for both the pan and cover. Two of these food containers 29 are placed in the compartment 27 of the oven 10, after a warm-up of the oven, the door 19 closed and the circuit breaker 52, which was initially actuated to bring the power supply via leads 53 and 54 to the oven temperature control unit 56, lead 53 connecting to terminal 57 thereof and lead 54 connecting to lower terminal 2 of terminal block 58, jumpered to lower terminal 3 of block 58 and thence via lead 59 through oven temperature control pilot lamp 47, lead 62 to lower terminal 1 of block 58 and via lead 63 to terminal 64 of the oven temperature control unit 56. The oven temperature control unit 56 controls flow of current to all electrical components except the mechanical timer unit 66, which is energized by lead 67 running from terminal 57 to terminal 68 and through the timer 66, and thence by parallel paths in which lead 69 connects through timer pilot lamp 72 and lead 73 to upper terminal 2 of block 58 and in which lead 74 connects through buzzer 76 and lead 77 also to upper terminal 2 of block 58.

When the oven temperature control unit 56 is in the OFF position, no current flows except to the timer unit 66, as indicated hereinbefore. If the timer unit 66 is set to a predetermined time interval, the timer pilot lamp 72 and buzzer 76 will operate at the end of the time interval, independent of any other controls. When the oven temperature control unit 56 is in any position other than OFF, it senses ambient temperature in the oven compartment 27 and regulates current flow through the top heat control unit 78 and bottom heat control unit 79, so as to maintain the oven ambient temperature set on the oven temperature control unit 56. The circuit for the bottom heat control unit 79 may be traced from the circuit breaker 52 over lead 53 to terminal 57 of and through the oven temperature control unit 56, terminal 64 thereof, over lead 81, through resistor 82, over lead 83, through bottom heat control unit 79 and thence over lead 84 to terminals 2 of block 58 and back over lead 54 to the circuit breaker 52, whereupon the bottom heat control unit 79 is energized to close a switch 86 for energizing the bottom-heating elements 25 over a circuit from terminal 64 of oven temperature control unit 56 via lead 63, terminals 1 of block 56, lead 87, through actuated switch 86 via lead 88, terminals 4 of block 58, leads 89 through bottom-heating elements 25, and thence via leads 91 through terminals 3 and 2 of block 58 and via lead 54 to the circuit breaker 52. Similarly the circuit for the top heat control unit may be traced from the circuit breaker 52 over lead 53 to terminal 57 of and through the oven temperature control unit 56, terminal 64 thereof, over lead 63, terminals 1 of block 58, lead 92, through top heat control 78, over lead 93 to terminals 2 of block 58, and back over lead 54 to the other side of circuit breaker 52, whereupon the top heat control unit 78 is energized to close a circuit for the top-heating elements 24 that can be traced therefrom via lead 94 through terminals 6 block 58, via leads 96 through top-heating elements 24 and thence back over leads 97, through terminals 5 of block 58 and over lead 98 to the other side of top heat control unit 78.

The top heat control unit 78 is an adjustable short interval pulsing device for regulating flow of current to the top radiant heating elements 24; while the bottom heat control unit 79 is an adjustable long interval pulsing device for regulating flow of current to the bottom radiant heating elements 25. As traced hereinbefore, both the top heat control unit 78 and the bottom heat control unit 79 are supplied with current from the oven temperature control unit. The pilot lamp 47 indicates when current is flowing through oven temperature control unit 56 and its circuit may be traced from one side of circuit breaker 52 via lead 53, terminal 57, through oven temperature control unit 56, terminal 64, over lead 63 to terminal 1 of block 58, thence over lead 62 through pilot lamp 47, over lead 59 to terminals 3 and 2 of block 58 and back over lead 54 to the other side of the circuit breaker 52.

Briefly, in heating frozen convenience food the oven is first preheated after which the frozen food which is disposed in aluminum pans 29 covered by aluminum foil 32 is placed in the compartment 27 (FIG. 4) on the "Hercuvit" conduction plate 28 and the door 19 is closed. The oven temperature control unit 56, which is calibrated in degrees Fahrenheit, is then set by turning knob 46 (FIG. 1) to the desired degree setting in order to regulate the optimal temperature within the compartment 27. The pilot lamp 47 will be extinguished when the set temperature is reached. This temperature is programmed to allow the highest energy output that the particular food product can absorb without burning the food. It has been found that there is a direct relationship between the interval of the applied electrical energy (pulsed heat) and the ability of the food product to absorb this energy rapidly without burning. The top-heating element 24 radiates directly on the aluminum foil cover 32 of the food pan 29 or directly upon the food, if the cover is removed. This heat source is capable of being pulsed when the type of food being warmed requires it by turning knob 43 from LO to HI, the low setting giving the smallest amount of radiant heat. The bottom-heating element 25 is regulated by the bottom heat control unit 79 to pulsate heat to the Hercuvit plate. A setting of 1 or lower of the knob 44 gives the shortest heat pulsation while a setting of 9 or higher produces the longest heat pulsation. Both the top and bottom heaters act to raise the ambient temperature in the oven compartment 27, so that the food is also being warmed by convection. The food, therefore, is subjected to a controlled heating cycle, which pumps heat into the product on all surfaces, through the bottom by conduction, through the top by radiation and all around four sides by convection. The timer unit 66 has a maximum time setting of 60 minutes. In order to set the timer unit the knob 42 is rotated clockwise (FIG. 1) to the desired time interval and, when the set time interval has elapsed, the buzzer 76 will be actuated as an audible sound and the timer pilot lamp 72 will be lighted to indicate that the food should be removed from the oven. Since the timer unit 66 does not automatically turn to OFF position, both the lamp 72 and buzzer 76 are deactivated by rotating the knob 42 counterclockwise to its OFF position.

It has been found that a wide variety of casserole type of frozen foods take about 60 minutes to reconstitute in conventional-type ovens, while ovens of this invention accomplish the same object in from 15 to 20 minutes.

Figure 5:
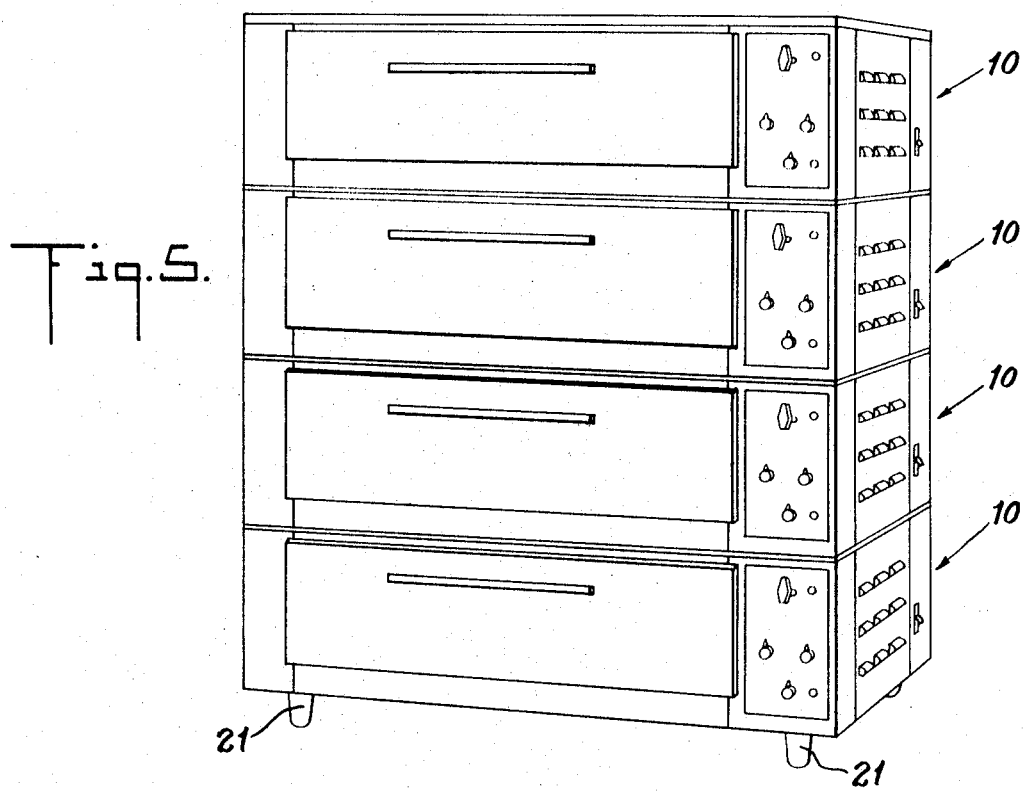
FIG. 5 is a perspective view of a plurality of electric ovens stacked one upon another.

In FIG. 5 is shown a plurality of electric ovens 10 stacked one upon another. This offers the advantage of being able to reconstitute different types of frozen food at the same time, since each oven is individually controlled and not affected adversely by the oven above or below it.

From the foregoing description it will be seen that the present invention provides an electric oven that can quickly reconstitute frozen convenience foods by utilizing in a novel manner conduction, radiation and convection.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. An electric oven comprising a compartment for heating frozen convenience food packaged in an aluminum pan, said compartment having a top wall, a bottom wall, two sidewalls, a backwall and an open front end in which each of said walls is backed with insulation, a plate disposed on said bottom wall for supporting said packaged food, said plate having a thermal conductivity of about 0.004 Cal./cm.$^2$/sec./° C., approximately equivalent to that of the food, and having a thickness of about one-fourth inch, a door for closing the open front end of said compartment, said door being hollow and provided with insulation, an electric heating element at said top wall of said compartment for directing infrared rays downwardly upon said packaged food, said top heating element being adapted to deliver heat energy in a wave length ranging from about 3 to 10 microns in order to allow some of the heat to be absorbed by the food in the pan while the remainder of the heat produces a required ambient condition within the compartment, electric control means for pulsing input wattage to said top heating element, an electric heating element at said bottom wall of said compartment for conducting heat upwardly through said plate into said packaged food, said bottom heating element being adapted to deliver a wattage of about 600 w./sq. ft. to said conductive plate, which latter is allowed to reach a maximum of about 450° F., electric control means for pulsing input wattage to said bottom heating element at an input cycle of about 30 to 70 percent of 5 minutes, so as to permit maximum tolerable energy flow by conduction through said plate, food pan and into the frozen food, and electric control means for regulating the temperature within said compartment so as to prevent the ambient condition from exceeding an oven air temperature of about 800° F., all of said electric control means being manually operable and said electric control means for said top and bottom heating elements being responsive to said temperature control means.

2. An electric oven in accordance with claim 1, and a manually operable timing means for setting a desired time interval for operation of the heating elements.

3. An electric oven in accordance with claim 2, and a pilot lamp and buzzer operable after said time interval has elapsed.

4. An electric oven in accordance with claim 1, in which said door is pivotally attached to said oven.

* * * * *